United States Patent
Sampath et al.

(10) Patent No.: US 9,435,240 B2
(45) Date of Patent: Sep. 6, 2016

(54) PERFORATED MIXING PIPE WITH SWIRLER

(71) Applicant: Tenneco Automotive Operating Company Inc., Lake Forest, IL (US)

(72) Inventors: Manoj K. Sampath, Ann Arbor, MI (US); Joshua Hicks, Linden, MI (US); Ryan A. Floyd, Mason, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/260,555

(22) Filed: Apr. 24, 2014

(65) Prior Publication Data

US 2015/0044103 A1   Feb. 12, 2015

Related U.S. Application Data

(63) Continuation-in-part of application No. 13/960,151, filed on Aug. 6, 2013.

(51) Int. Cl.
| | |
|---|---|
| *F01N 1/00* | (2006.01) |
| *F01N 3/20* | (2006.01) |
| *B01F 5/00* | (2006.01) |
| *B01F 5/04* | (2006.01) |

(Continued)

(52) U.S. Cl.
CPC ............ *F01N 3/206* (2013.01); *B01F 3/04049* (2013.01); *B01F 5/0062* (2013.01); *B01F 5/0451* (2013.01); *B01F 5/0616* (2013.01); *F01N 3/2066* (2013.01); *B01F 2005/0639* (2013.01); *F01N 2240/20* (2013.01); *F01N 2610/02* (2013.01); *Y02T 10/24* (2013.01)

(58) Field of Classification Search
CPC ........ F02D 41/029; F02D 9/04; F01N 9/002; F01N 3/0842; F01N 3/035; F01N 13/02; F01N 13/10; F01N 2240/20; F01N 1/166
USPC ............................................ 60/295, 301, 324
See application file for complete search history.

(56) References Cited

U.S. PATENT DOCUMENTS

| | | |
|---|---|---|
| 3,797,240 A | 3/1974 | Inoue et al. |
| 4,043,539 A | 8/1977 | Gilmer et al. |
| 4,571,938 A | 2/1986 | Sakurai |

(Continued)

FOREIGN PATENT DOCUMENTS

| | | | |
|---|---|---|---|
| DE | 3940747 C1 * | 7/1990 | ............. B01D 53/86 |
| DE | 4121940 A1 | 1/1993 | |

(Continued)

OTHER PUBLICATIONS

Machine Translation of DE 102008029110, Translated on Nov. 16, 2015.*

*Primary Examiner* — Patrick Maines
(74) *Attorney, Agent, or Firm* — Harness, Dickey & Pierce, P.L.C.

(57) ABSTRACT

An aftertreatment system may include an exhaust pipe and a mixing pipe. The exhaust pipe receives exhaust gas from an engine. The mixing pipe is disposed in the exhaust pipe and may include a tubular portion and a plurality of blades extending from a longitudinal end of the tubular portion. The tubular portion may include a plurality of openings extending through inner and outer diametrical surfaces of the tubular portion. The tubular portion and the plurality of blades may define an integrally formed unitary body.

23 Claims, 13 Drawing Sheets

(51) Int. Cl.
*B01F 5/06* (2006.01)
*B01F 3/04* (2006.01)

(56) References Cited

U.S. PATENT DOCUMENTS

| | | | |
|---|---|---|---|
| 4,909,635 A | 3/1990 | Lecoffre et al. | |
| 4,912,920 A | 4/1990 | Hirabayashi | |
| 5,339,630 A * | 8/1994 | Pettit | 60/303 |
| 5,426,269 A | 6/1995 | Wagner et al. | |
| 6,442,933 B2 | 9/2002 | Rusch | |
| 6,449,947 B1 | 9/2002 | Liu et al. | |
| 6,536,420 B1 * | 3/2003 | Cheng | 123/590 |
| 6,722,123 B2 | 4/2004 | Liu et al. | |
| 6,722,124 B2 | 4/2004 | Pawson et al. | |
| 6,767,378 B2 | 7/2004 | Nishiyama et al. | |
| 7,328,572 B2 | 2/2008 | McKinley et al. | |
| 7,562,521 B2 | 7/2009 | Shirai et al. | |
| 7,748,212 B2 | 7/2010 | Sedlacek et al. | |
| 8,033,104 B2 | 10/2011 | Zhang | |
| 8,141,353 B2 | 3/2012 | Zheng et al. | |
| 8,181,446 B2 | 5/2012 | Honda et al. | |
| 8,215,450 B2 | 7/2012 | Chien | |
| 8,240,137 B2 | 8/2012 | Liu et al. | |
| 8,272,777 B2 | 9/2012 | Kohrs et al. | |
| 8,276,372 B2 | 10/2012 | Kowada | |
| 8,347,610 B2 | 1/2013 | Kowada | |
| 8,359,838 B2 | 1/2013 | Yamazaki et al. | |
| 8,375,709 B2 | 2/2013 | Salanta et al. | |
| 8,397,492 B2 | 3/2013 | Kowada | |
| 8,397,495 B2 | 3/2013 | Salanta et al. | |
| 8,499,548 B2 | 8/2013 | De Rudder et al. | |
| 2006/0218902 A1 | 10/2006 | Arellano et al. | |
| 2007/0245718 A1 * | 10/2007 | Cheng et al. | 60/286 |
| 2007/0274877 A1 * | 11/2007 | Bush et al. | 422/176 |
| 2008/0184700 A1 * | 8/2008 | Harrer | 60/295 |
| 2008/0216470 A1 | 9/2008 | Sedlacek et al. | |
| 2008/0250776 A1 * | 10/2008 | Brown et al. | 60/299 |
| 2008/0307780 A1 | 12/2008 | Iverson et al. | |
| 2009/0019843 A1 | 1/2009 | Levin et al. | |
| 2009/0178395 A1 | 7/2009 | Huffmeyer | |
| 2009/0255242 A1 * | 10/2009 | Paterson | B01F 3/02 60/320 |
| 2009/0313979 A1 | 12/2009 | Kowada | |
| 2010/0000205 A1 * | 1/2010 | Freese, V | F01N 3/05 60/320 |
| 2010/0263359 A1 * | 10/2010 | Haverkamp et al. | 60/303 |
| 2011/0094206 A1 * | 4/2011 | Liu et al. | 60/274 |
| 2011/0099978 A1 | 5/2011 | Davidson et al. | |
| 2011/0308234 A1 | 12/2011 | De Rudder et al. | |
| 2012/0204541 A1 | 8/2012 | Li et al. | |
| 2013/0098002 A1 | 4/2013 | Danckert et al. | |
| 2013/0164181 A1 * | 6/2013 | Iijima et al. | 422/169 |
| 2014/0033686 A1 | 2/2014 | Fischer et al. | |
| 2014/0077400 A1 * | 3/2014 | Sampath et al. | 261/74 |

FOREIGN PATENT DOCUMENTS

| | | | |
|---|---|---|---|
| DE | 4203807 A1 | 8/1993 | |
| DE | 4307525 A1 | 9/1994 | |
| DE | 4417238 A1 | 9/1994 | |
| DE | 102008029110 A1 * | 12/2009 | B01F 3/04049 |
| DE | 102009036511 A1 * | 2/2011 | B01F 3/04049 |
| DE | WO 2013087852 A2 * | 6/2013 | B01F 5/0616 |
| DE | 102012010878 * | 12/2013 | |
| DE | 102013211662 A1 * | 12/2014 | F01N 3/2066 |
| EP | 0470361 A1 | 2/1992 | |
| EP | 1262644 A2 | 12/2002 | |
| EP | 2111916 A1 | 10/2009 | |
| EP | 2168672 A1 | 3/2010 | |
| EP | 2465602 A2 | 6/2012 | |
| JP | 10231721 A * | 9/1998 | |
| WO | 03036056 A1 | 5/2003 | |
| WO | 2009024815 A2 | 2/2009 | |
| WO | 2012044233 A1 | 4/2012 | |
| WO | WO 2012044233 * | 4/2012 | |

* cited by examiner

PERFORATED MIXING PIPE WITH SWIRLER

CROSS-REFERENCE TO RELATED APPLICATIONS

This application is a continuation-in-part of U.S. patent application Ser. No. 13/960,151 filed on Aug. 6, 2013. The entire disclosure of the above application is incorporated herein by reference.

FIELD

The present disclosure relates to an aftertreatment system for a vehicle, and more particularly, to an aftertreatment system having a perforated mixing pipe with a swirler.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems are constructed using urea-based technology including a container for storing a reductant (e.g., urea) and a delivery system for transmitting the reductant from the container to the exhaust stream. A mixer is typically provided for mixing the injected reductant with the exhaust gas before the reductant reaches a catalyst with which the reductant reacts. While these systems may have performed well in the past, it may be desirable to provide an improved mixer to more efficiently and effectively mix the reductant with the exhaust stream and provide a more even distribution of reductant over a larger area of the catalyst while reducing impingement of the reductant fluid on surfaces of the mixer and reducing accumulation of reductant deposits.

SUMMARY

This section provides a general summary of the disclosure, and is not a comprehensive disclosure of its full scope or all of its features.

In one form, the present disclosure provides an aftertreatment system that may include an exhaust pipe and a mixing pipe. The exhaust pipe may receive exhaust gas from an engine and may include a first portion defining a first longitudinal axis and a second portion defining a second longitudinal axis that is angled relative to the first axis. The mixing pipe may be disposed in the exhaust pipe and may include a tubular portion and a collar extending radially outward from the tubular portion. The tubular portion may include a plurality of openings and a plurality of deflectors. The plurality of openings may extend through inner and outer diametrical surfaces of the tubular portion. Each of the plurality of deflectors may be disposed adjacent a corresponding one of the plurality of openings.

In some embodiments, the tubular portion may be coaxial with the second portion of the exhaust pipe.

In some embodiments, the deflectors may extend outward from the outer diametrical surface.

In some embodiments, the deflectors may extend inward from the inner diametrical surface.

In some embodiments, the collar may extend from a downstream end of the tubular portion.

In some embodiments, the collar may include a swirler having a plurality of blades extending radially outward from the tubular portion.

In some embodiments, each of the blades may include a radially inner end and a radially outer end. The radially outer ends may be spaced apart from each other.

In some embodiments, the radially outer ends contact an inner diametrical surface of the exhaust pipe.

In some embodiments, each of the blades may include a tab extending radially inward from an edge of the blade between the radially inner and outer ends.

In some embodiments, radially extending edges of the blades may be angled so that the radially inner end of each blade and the outer end of the same blade are rotationally misaligned with each other.

In some embodiments, an intersection between the first and second longitudinal axes may be disposed within the tubular portion.

In some embodiments, the first and second longitudinal axes may be substantially perpendicular to each other.

In some embodiments, the aftertreatment system may include a reductant injector disposed along the second longitudinal axis at an upstream end of the tubular portion.

In some embodiments, the aftertreatment system may include a catalyst disposed downstream of the mixing pipe.

In another form, the present disclosure provides an aftertreatment system that may include an exhaust pipe and a mixing pipe. The exhaust pipe may receive exhaust gas from an engine and may include a first portion defining a first longitudinal axis and a second portion defining a second longitudinal axis that is angled relative to the first axis. The mixing pipe may be disposed in the exhaust pipe and may include a tubular portion and a swirler extending radially from the tubular portion. The tubular portion may include a plurality of openings extending through inner and outer diametrical surfaces of the tubular portion. The swirler may include a plurality of blades extending radially outward from the tubular portion.

In some embodiments, the tubular portion may be coaxial with the second portion of the exhaust pipe.

In some embodiments, the tubular portion may include a plurality of deflectors. Each of the deflectors may be disposed adjacent a corresponding one of the plurality of openings.

In some embodiments, the deflectors may extend outward from the outer diametrical surface.

In some embodiments, the deflectors may extend inward from the inner diametrical surface.

In some embodiments, the swirler may extend from a downstream end of the tubular portion.

In some embodiments, each of the blades may include a radially inner end and a radially outer end. The radially outer ends may be spaced apart from each other.

In some embodiments, the radially outer ends may contact an inner diametrical surface of the exhaust pipe.

In some embodiments, each of the blades may include a tab extending radially inward from an edge of the blade between the radially inner and outer ends.

In some embodiments, radially extending edges of the blades may be angled so that the radially inner end of each blade and the outer end of the same blade are rotationally misaligned with each other.

In some embodiments, an intersection between the first and second longitudinal axes may be disposed within the tubular portion.

In some embodiments, the first and second longitudinal axes may be substantially perpendicular to each other.

In some embodiments, the aftertreatment system may include a reductant injector disposed along the second longitudinal axis at an upstream end of the tubular portion.

In some embodiments, the aftertreatment system may include a catalyst disposed downstream of the mixing pipe.

In another form, the present disclosure provides a method of mixing exhaust gas and reductant in an aftertreatment system. The method may include providing a mixing device in an exhaust pipe through which exhaust gas from an engine flows. The mixing device may include a tubular portion. A first portion of the exhaust gas may be received in the tubular portion through a plurality of openings in the tubular portion. A second portion of the exhaust gas may be allowed to flow between the tubular portion and an inner diametrical surface of the exhaust pipe. Reductant may be injected into the tubular portion. A first swirling flow pattern may be generated within the tubular portion. A second swirling flow pattern may be generated with the second portion of the exhaust gas the second swirling flow pattern surrounding the first swirling flow pattern.

In some embodiments, the first swirling flow pattern may be in one of a clockwise direction and a counterclockwise direction and the second swirling flow pattern may be in the other of the clockwise and counterclockwise directions. In some embodiments, the first and second flow patterns may be in the same direction.

In some embodiments, the first swirling flow pattern may be generated with a plurality of deflectors extending radially outward from the tubular portion.

In some embodiments, the first swirling flow pattern may be generated with a plurality of deflectors extending radially inward from the tubular portion.

In some embodiments, the second swirling flow pattern may be generated with a plurality of blades extending radially outward from the tubular portion.

In some embodiments, the method may include blending the first and second swirling flow patterns downstream of the mixing device.

In another form, the present disclosure provides an aftertreatment system that may include an exhaust pipe and a mixing pipe. The exhaust pipe receives exhaust gas from an engine and includes a first portion and a second portion that is angled relative to the first portion. The mixing pipe is disposed in the exhaust pipe and may include a tubular portion and a plurality of blades extending from a longitudinal end of the tubular portion. The tubular portion may include a plurality of openings extending through inner and outer diametrical surfaces of the tubular portion. Each of the plurality of blades may extend downstream of the tubular portion and radially outward from the tubular portion.

In some embodiments, the exhaust pipe includes an upstream portion and a downstream portion that is angled relative to the upstream portion. The blades may curve around a longitudinal axis of the downstream portion of the exhaust pipe.

In some embodiments, the blades may include a generally helical shape.

In some embodiments, the plurality of blades and the tubular portion define an integrally formed unitary body.

In some embodiments, the mixing pipe includes a smooth transition (e.g., edgeless) that is free of steps between the tubular portion and the plurality of blades.

In some embodiments, the plurality of openings are arranged in a plurality of rows extending circumferentially around the tubular portion. The openings of adjacent rows may be misaligned with each other in a direction parallel to the longitudinal axis of the downstream portion of the exhaust pipe.

In some embodiments, the aftertreatment system may include an annular member disposed within the exhaust pipe radially between an inner diameter of the downstream portion of the exhaust pipe and radially outermost portions of the plurality blades. The annular member may support the plurality of blades relative to the exhaust pipe.

In some embodiments, the tubular portion includes a plurality of deflectors. Each of the plurality of deflectors may be disposed adjacent a corresponding one of the plurality of openings.

In some embodiments, the deflectors extend outward from the outer diametrical surface.

In some embodiments, each of the plurality of blades includes a distal end having an L-shaped profile.

In some embodiments, each of the blades includes a radially inner end and a radially outer end. The radially outer ends are spaced apart from each other.

In some embodiments, the aftertreatment system includes a reductant injector disposed along the longitudinal axis of the downstream portion of the exhaust pipe at an upstream end of the tubular portion; and a catalyst disposed downstream of the mixing pipe and the reductant injector.

Fluid flowing from the first portion of the exhaust pipe to into the downstream portion flows along one of a plurality of flow paths, each flow path having a radius of a different size. In some embodiments, one of the blades is disposed along the flow path having the smallest radius.

In some embodiments, the mixing pipe defines a first exhaust flow path flowing through at least one of the openings and a second exhaust flow path flowing outside of the tubular portion and between the blades.

In some embodiments, the second exhaust flow path is an annular flow path extending around the tubular portion.

Each of the blades includes a first end attached to the tubular portion and a second end that is spaced apart from the tubular portion and unattached to adjacent blades.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
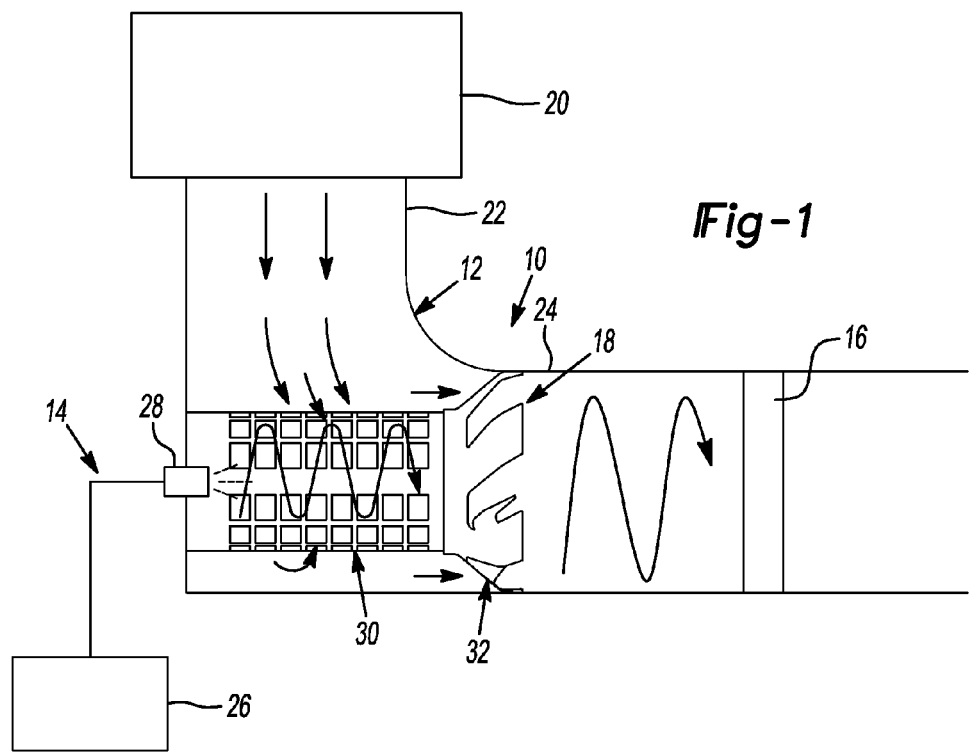
FIG. 1 is a schematic representation of an engine and an exhaust aftertreatment system according to the principles of the present disclosure.
Figure 2:
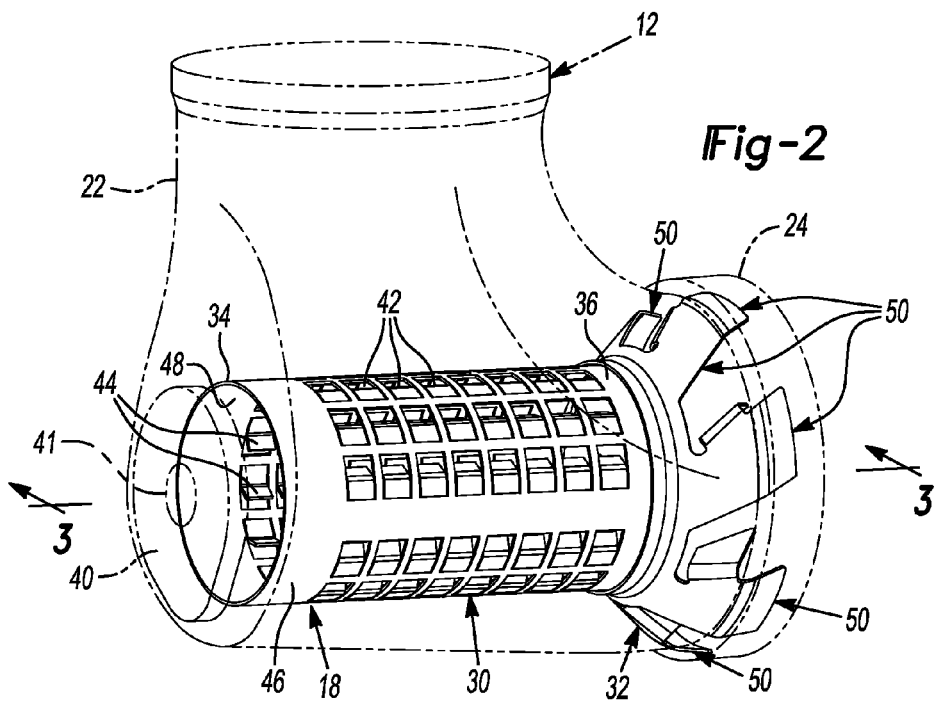
FIG. 2 is a perspective view of a mixing pipe disposed in an exhaust pipe of the aftertreatment system.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may include an exhaust pipe 12, a reductant delivery system 14, an aftertreatment device 16 and a mixing pipe 18. The exhaust pipe 12 may receive exhaust gas discharged from a combustion engine 20. Exhaust gas discharged into the exhaust pipe 12 may flow through the mixing pipe 18 and the aftertreatment device 16 before being discharged to the ambient environment.

Figure 3:
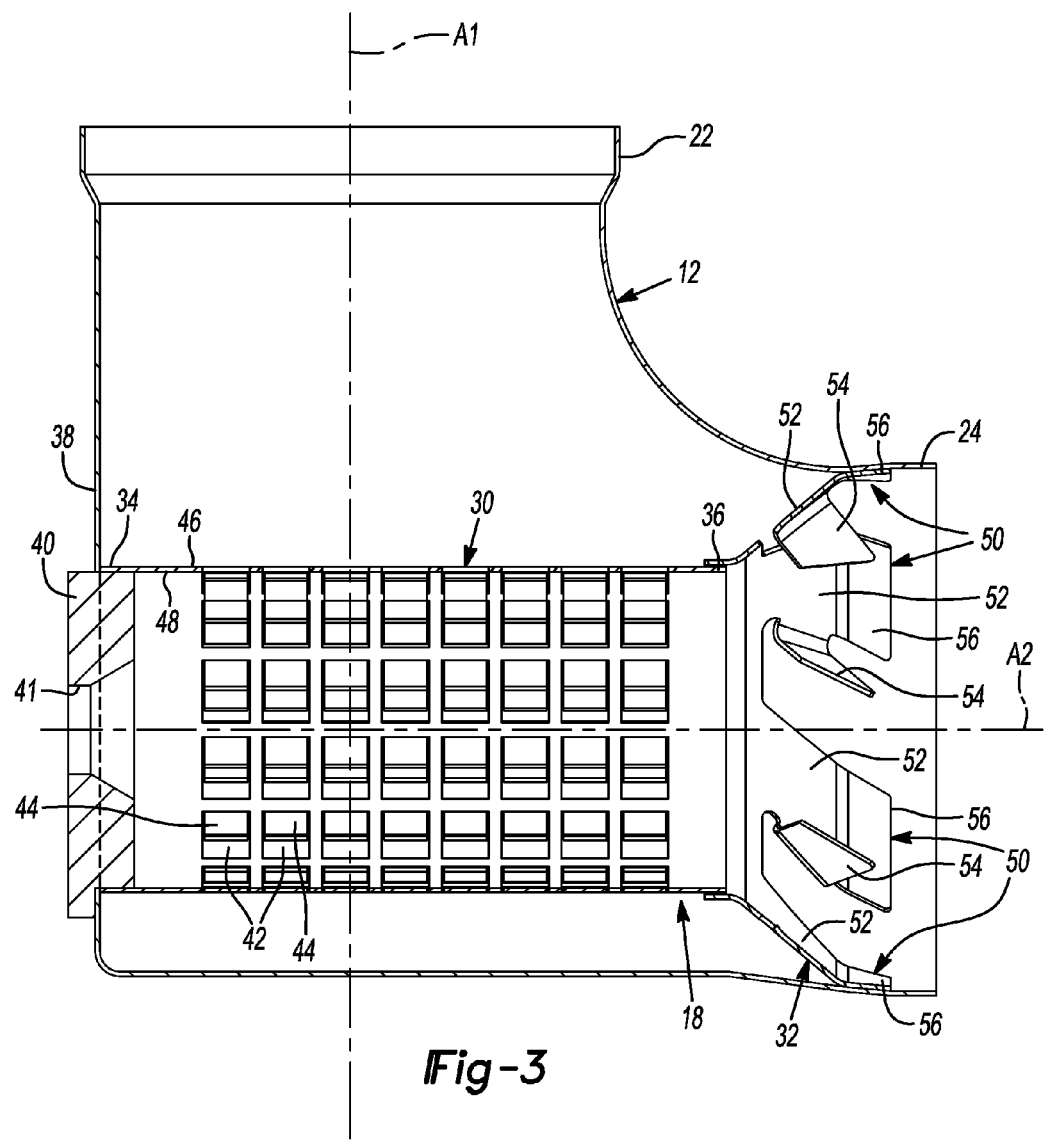
FIG. 3 is a cross-sectional view of the mixing pipe and exhaust pipe of FIG. 2.
Figure 4:
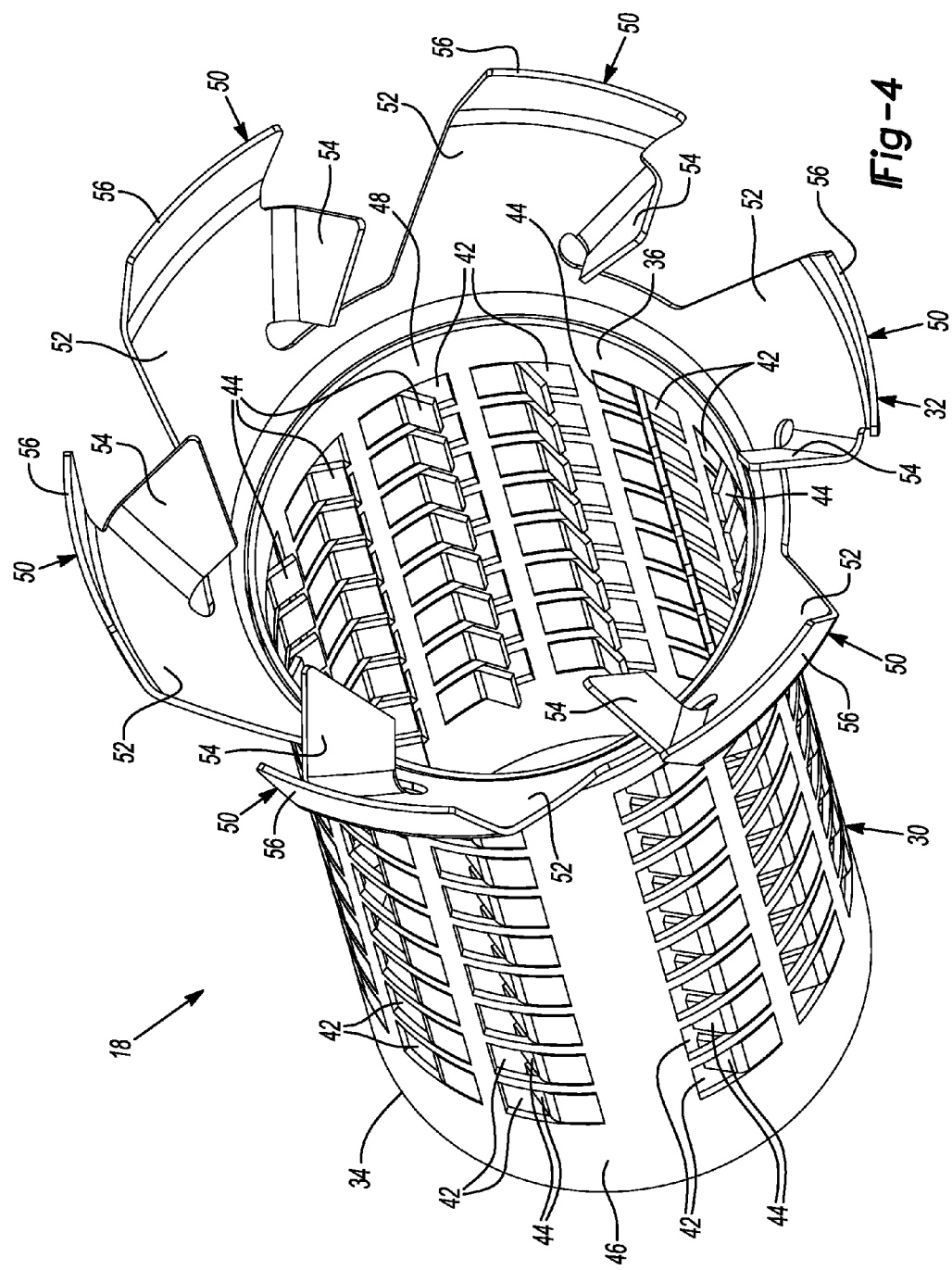
FIG. 4 is a perspective view of the mixing pipe.

The exhaust pipe 12 may include first and second portions 22, 24 defining a ninety-degree bend. The first portion 22 may be defined by a first longitudinal axis A1 (FIG. 3), and the second portion 24 may be defined by a second longitudinal axis A2 (FIG. 3). While the exhaust pipe 12 is shown in the figures as having a ninety-degree bend, it will be appreciated that the exhaust pipe 12 could have a bend of less than or greater than ninety degrees and could have any suitable configuration such as an S-shape (i.e., multiple bends), for example. In some embodiments, the exhaust pipe 12 may include a third portion (not shown) downstream of the second portion 24 that may be approximately parallel to the first portion 22.

The reductant delivery system 14 may pump reductant (e.g., urea or ammonia) from a tank 26 to a reductant injector 28 that may spray the reductant into the exhaust stream at or upstream of the mixing pipe 18. The mixing pipe 18 may mix the reductant with the exhaust gas to provide a more uniform mixture of reductant and exhaust gas before the mixture enters the aftertreatment device 16 as well as to convert urea to ammonia by promoting evaporation of the water.

The aftertreatment device 16 can be an SCR (selective catalytic reduction) catalyst, for example. A reaction between the reductant and the aftertreatment device 16 may convert nitrogen oxides in the exhaust gas to nitrogen ($N_2$), water and/or carbon dioxide, for example.

Referring now to FIGS. 1-5, the mixing pipe 18 may include a tubular portion 30, and a swirler or collar 32. A first portion of the exhaust gas flowing through the exhaust pipe 12 may flow into the tubular portion 30 and a second portion of the exhaust gas may flow around the tubular portion 30 and through the collar 32. The tubular portion 30 may include an upstream end 34 and a downstream end 36. The upstream end 34 may abut a wall 38 of the first portion 22 of the exhaust pipe 12. An injector mounting plate 40 may extend through the wall 38 and into the tubular portion 30 at the upstream end 34. The reductant injector 28 may extend through an aperture 41 in the injector mounting plate 40 and may extend into the tubular portion 30.

The tubular portion 30 may include a longitudinal axis that is collinear with the second longitudinal axis A2 (FIG. 3). The tubular portion 30 may include an outer diameter that is less than an inner diameter of the first and second portions 22, 24 of the exhaust pipe 12. The tubular portion 30 may include a plurality of openings 42 and a plurality of deflectors 44 arranged in rows extending around the diameter of the tubular portion 30 and in columns extending between the upstream and downstream ends 34, 36 of the tubular portion 30. The openings 42 may extend through outer and inner diametrical surfaces 46, 48 of the tubular portion 30. The deflectors 44 may be partially cut or stamped out of the tubular portion 30 (thereby forming the openings 42) and bent inward into the tubular portion 30.

Some of the fluid flowing through the exhaust pipe 12 from the first portion 22 to the second portion 24 may enter the tubular portion 30 through the openings 42 and may be directed by the deflectors 44 in a rotational direction to generate a first swirling flow pattern within the tubular portion 30 that swirls around the longitudinal axis A2. This swirling flow pattern facilitates atomization of the reductant and mixing of the reductant with the exhaust gas. The swirling flow pattern may also restrict or prevent impingement of the reductant fluid on the surfaces of the mixing pipe 18, the exhaust pipe 12 and/or the aftertreatment device 16, which reduces the formation and/or buildup of reductant deposits on the mixing pipe, exhaust pipe 12 and the aftertreatment device 16. In some embodiments, the mixing pipe 18 may include a hydrolysis coating to further reduce the formation and/or buildup of reductant deposits on the mixing pipe 18.

Figure 5:
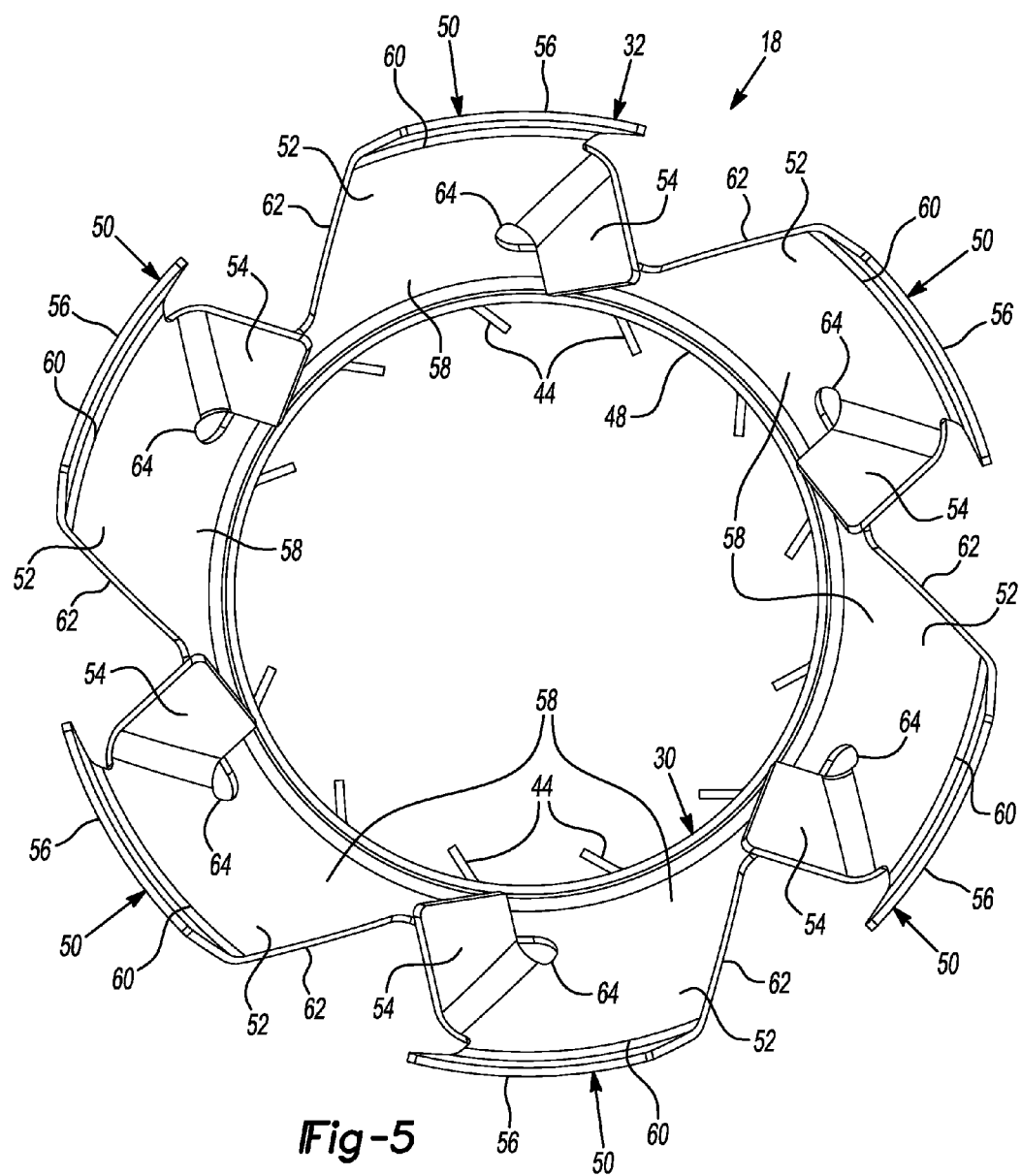
FIG. 5 is a plan view of a downstream end of the mixing pipe.
Figure 6:
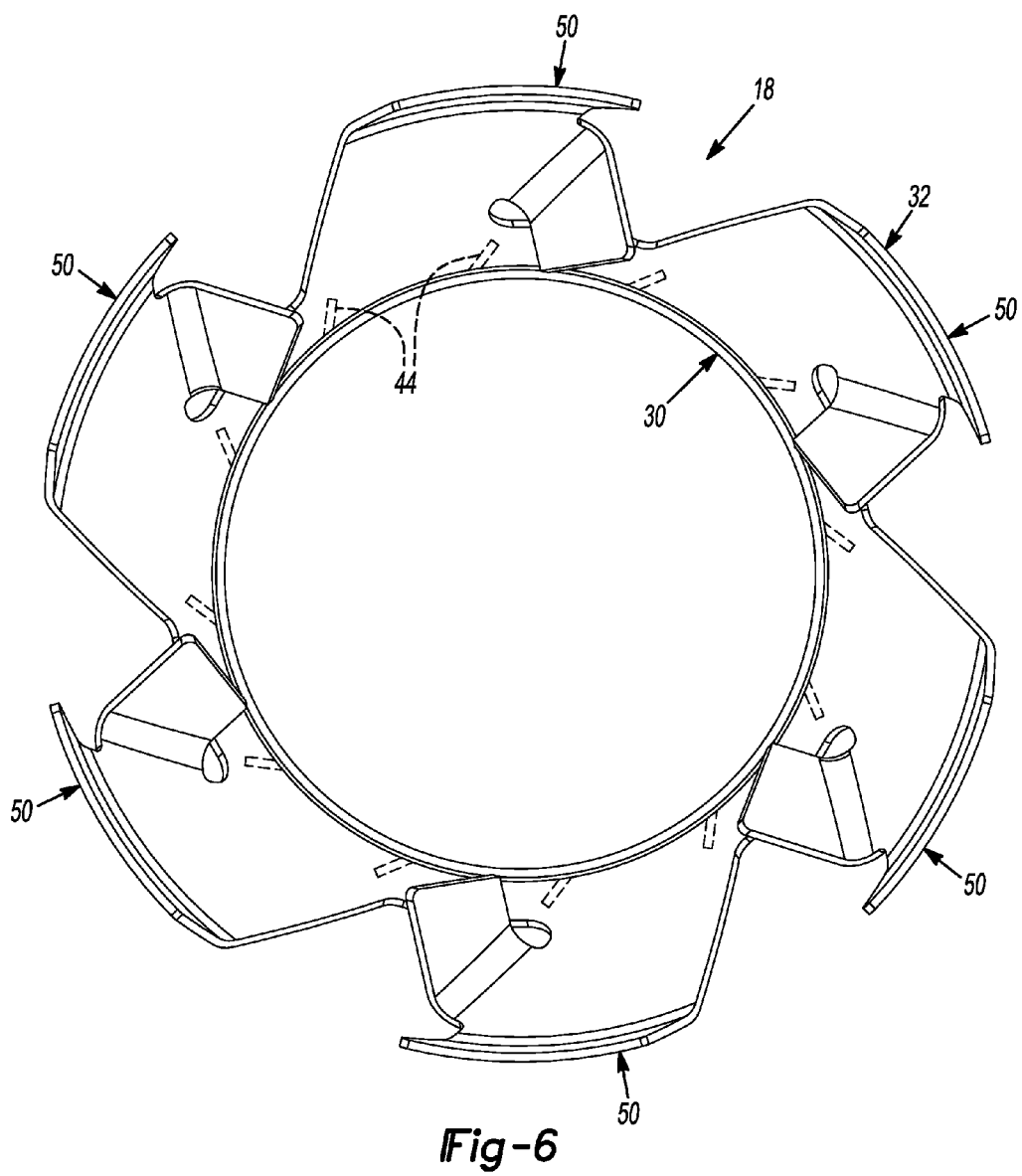
FIG. 6 is a plan view of a downstream end of another embodiment of a mixing pipe according to the principles of the present disclosure.

While the deflectors 44 are shown in FIGS. 2-5 as extending inward into the tubular portion 30, in some embodiments, the deflectors 44 may be formed to extend outward from the outer diametrical surface 46 of the tubular portion 30, as shown in FIG. 6. With the deflectors 44 extending radially outward, the opportunity for reductant deposits to form on the deflectors 44 may be further reduced, while the swirling flow pattern within the tubular portion 30 is still able to be effectively generated.

The collar 32 may be generally conical in its overall shape and may extend radially outward and axially downstream from the downstream end 36 of the tubular portion 30. The collar 32 may be welded and/or otherwise secured to the tubular portion 30. In some embodiments, the collar 32 may be integrally formed with the tubular portion 30. In some embodiments, a transition between the tubular portion 30 and the collar 32 may be smooth, edgeless and/or seamless. That is, the transitions may not include steps or ridges, for example. The smooth, edgeless transitions may reduce backpressure in the flow of exhaust through the mixing pipe 18. The smooth, edgeless transitions may also reduce or prevent the buildup of reductant deposits and/or other deposits on the mixing pipe 18.

The collar 32 may include a plurality of blades 50 arranged in a circular array extending around the longitudinal axis of the tubular portion 30. Each of the blades 50 may include a body 52 and first and second tabs 54, 56 extending from the body 52. The body 52 may be disposed at an angle relative to the longitudinal axis of the tubular portion 30 and may include a proximal end 58 (i.e., a radially inner end), a distal end 60 (i.e., a radially outer end), and first and second lateral edges 62, 64 extending between the proximal and distal ends 58, 60, as shown in FIG. 5. The angle of the body 52 relative to the longitudinal axis may be customized for a particular application to achieve a desired amount of turbulence. The first tab 54 may extend radially inward from the second lateral edge 64 toward the longitudinal axis of the tubular portion 30. The second tab 56 may radially outward and axially downstream from the distal end 60. The second tabs 56 may contact the inner diametrical surface of the second portion 24 of the exhaust pipe 12. In some embodiments, the second tabs 56 may be welded and/or otherwise fixed to the inner diametrical surface of the second portion 24.

As shown in FIG. 5, the lateral edges 62, 64 of the body 52 may be angled so that the proximal end 58 of each blade 50 and the distal end 60 of the same blade 50 are rotationally misaligned with each other. That is, each blade 50 may be angled to extend in a generally clockwise direction as it extends radially outward from the tubular portion 30 when viewed from the frame of reference of FIG. 5. It will be appreciated that in some embodiments, the blades 50 could be angled to extend in a generally counterclockwise direction as they extend radially outward from the tubular portion 30 when viewed from the frame of reference of FIG. 5.

The geometry of the blades 50 and the orientation of the blades 50 relative to each other, the tubular portion 30 and the exhaust pipe 12 may cause the fluid flowing through the collar 32 to flow in a second rotational or swirling flow pattern around the longitudinal axis A2 and around the first swirling flow pattern of fluid that flowed through the tubular portion 30. These two coaxial swirling flow patterns may result in improved mixture of the reductant and exhaust gas before the reductant and exhaust gas flow into the aftertreatment device 16. Furthermore, this improved mixing can be accomplished with a shorter length of pipe between the reductant injector 28 and the aftertreatment device 16 than may have been required for adequate mixing in prior-art aftertreatment systems.

It will be appreciated that the blades 50 and the deflectors 44 could be oriented so that the first and second swirling flow patterns rotate in the same rotational direction or in opposite rotational directions. In some embodiments, the tubular portion 30 could include scoops (not shown) that extend radially inward or radially outward therefrom in addition to or instead of the generally flat deflectors 44. Additionally or alternatively, the collar 32 could include scoops (not shown) in addition to or instead of the blades 50. The scoops could include a geometry that curves in three dimensions and/or spiraled geometry, for example, to induce a swirling flow pattern. In some embodiments, the collar 32 could be a conical or funnel-shaped member having one or more openings therein instead of a plurality of blades or scoops.

While the mixing pipe 18 is described above as being used in a SCR dosing application, it will be appreciate that the mixing pipe 18 could be used in a hydrocarbon dosing application, in which the mixing pipe 18 may mix injected hydrocarbon with the exhaust gas.

Figure 7:
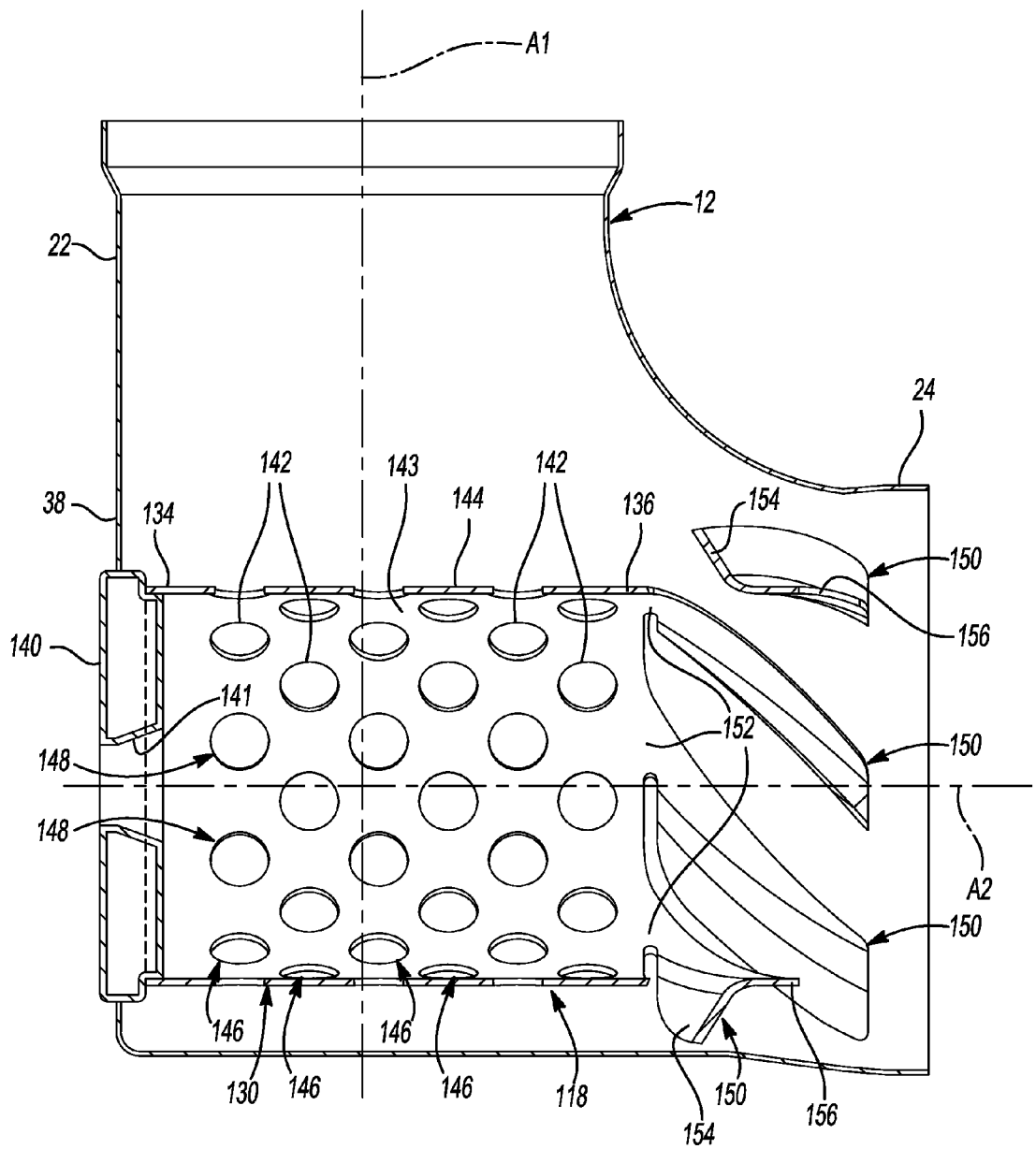
FIG. 7 is a cross-sectional view of another mixing pipe and exhaust pipe according to the principles of the present disclosure.
Figure 8:
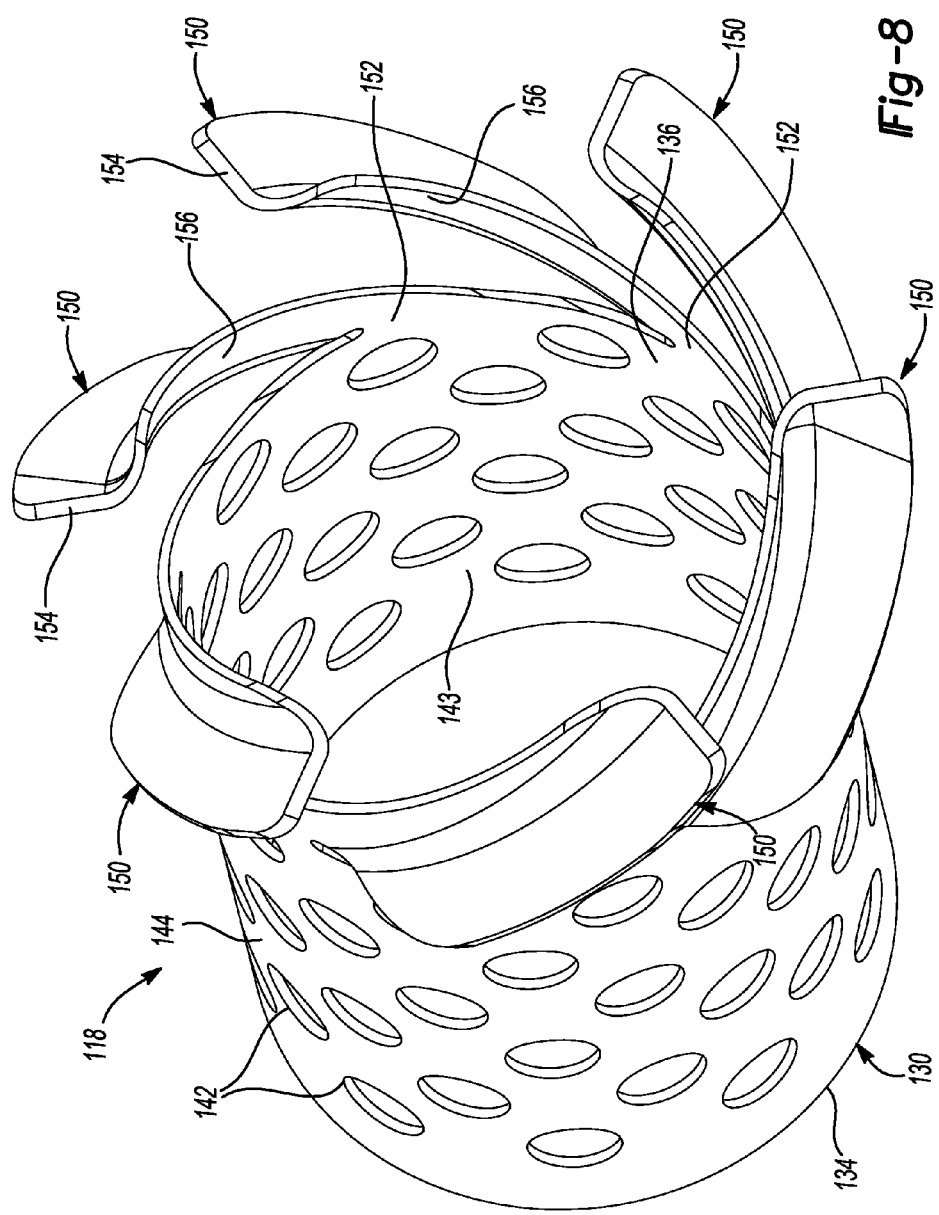
FIG. 8 is a perspective view of the mixing pipe of FIG. 7.
Figure 9:
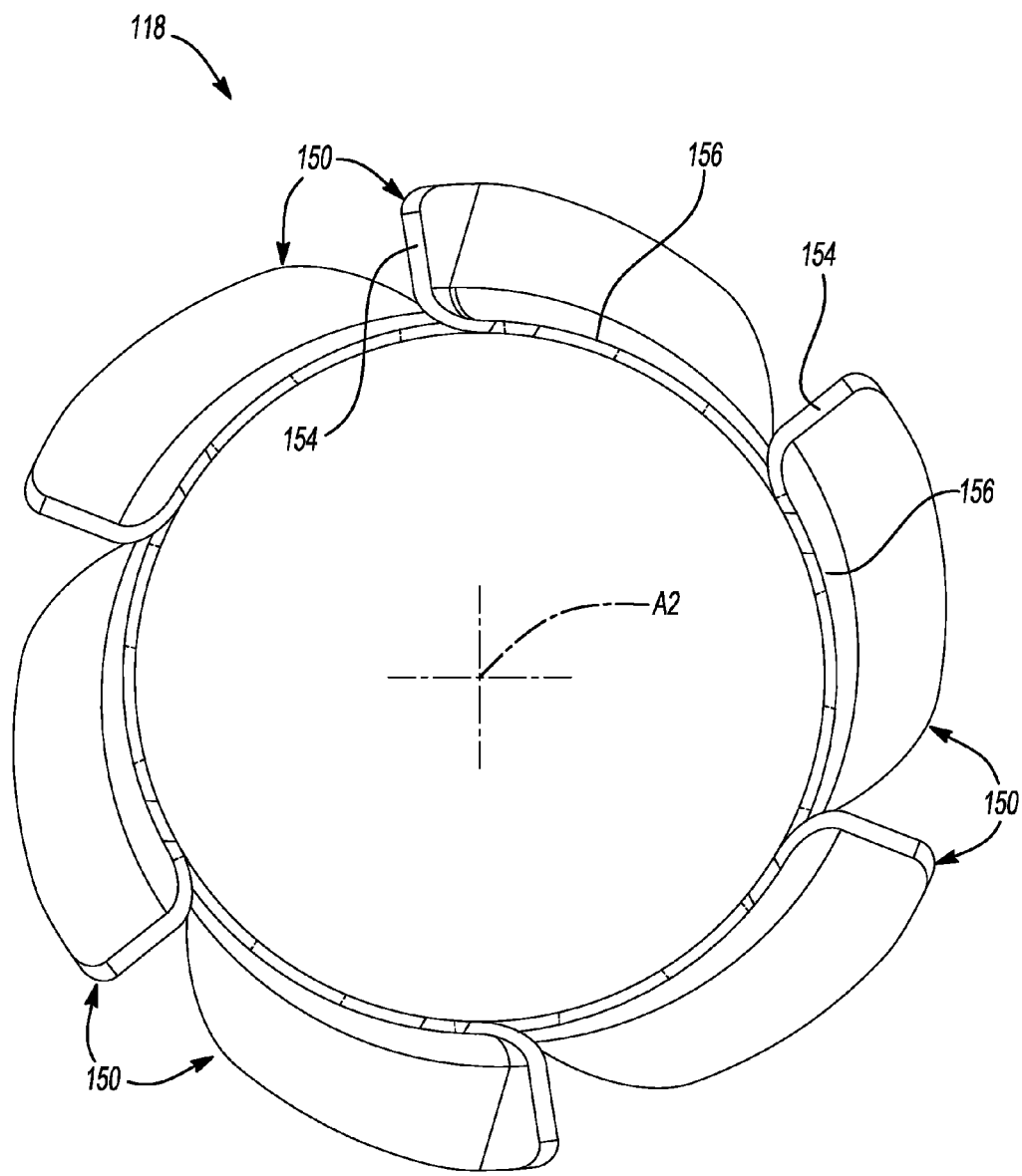
FIG. 9 is a plan view of a downstream end of the mixing pipe of FIG. 7.

With reference to FIGS. 7-9, another mixing pipe 118 is provided that may be installed in the exhaust pipe 12 instead of the mixing pipe 18. The structure and function of the mixing pipe 118 may be similar or identical to that of the mixing pipe 18, apart from any differences described below and/or shown in the figures. The mixing pipe 118 may include a tubular portion 130 and a plurality of blades 150 extending from a downstream end 136 of the tubular portion 130. An injector mounting plate 140 may extend through the wall 38 of the exhaust pipe 12 and engage an upstream end 134 of the tubular portion 130. The reductant injector 28 described above may extend through an aperture 141 in the injector mounting plate 140 and may inject reductant into the tubular portion 130. As described above with respect to the mixing pipe 18, the mixing pipe 118 may induce turbulence in the flow of exhaust gas flowing from the first portion 22 of the exhaust pipe 12 to the second portion 24 of the exhaust pipe 12 to facilitate mixing of the reductant with the exhaust gas.

The tubular portion 130 may include inner and outer diametrical surfaces 143, 144 and a plurality of openings 142 extending through the inner and outer diametrical surfaces 143, 144. While the openings 142 shown in FIGS. 7 and 8 have a circular shape, it will be appreciated that the openings 142 could have any shape, such as rectangular, square, or oval, for example. Furthermore, the size of each opening 142 and the total number of openings 142 can vary, as well.

The openings 142 may be arranged in a plurality of parallel rows 146 (FIG. 7) extending circumferentially around the tubular portion 130. As shown in FIG. 7, the openings 142 of adjacent rows 146 may be misaligned with each other in a direction parallel to the second longitudinal axis A2. The openings 142 may be arranged in columns 148 (extending parallel to the second longitudinal axis A2) that each include one of the openings 142 of every alternate row 146. This arrangement of the openings 142 reduces or prevents liquid droplets that have impinged on the inner diametrical surface 143 from flowing along the inner diametrical surface 143 for any extended length. That is, any path parallel (or nearly parallel) to the second longitudinal axis A2 that such an impinged droplet may follow along the inner diametrical surface 143 will eventually reach one of the openings 142 and will be drawn back into the exhaust stream by the flow of exhaust gas through and around the openings 142.

The blades 150 may extend downstream away from the downstream end 136 of the tubular portion 130 and radially outward therefrom. The blades 150 curve around the second longitudinal axis A2 as they extend downstream. As shown in FIGS. 7 and 8, the blades 150 and the tubular portion 130 may define a unitary body integrally formed from a common sheet of material. Transitions 152 between the tubular portion 130 and the blades 150 may be smooth, edgeless and/or seamless. That is, the transitions 152 may not include steps or ridges, for example. The smooth, edgeless transitions 152 may reduce backpressure in the flow of exhaust through the mixing pipe 118. The smooth, edgeless transitions 152 may also reduce or prevent the buildup of reductant deposits and/or other deposits on the mixing pipe 118.

In some embodiments, the blades 150 may include a generally L-shaped cross section or profile. In this manner, a first portion 154 of each blade 150 may extend substantially radially outwardly and a second portion 156 of each blade 150 may extend substantially in the downstream direction. In some embodiments, the blades 150 may have a generally helical shape. In some embodiments, the blades 150 may be generally flattened and angled, rather than helical. The precise number, shape and spacing of the blades 150 may be varied from that of the blades 150 depicted in FIGS. 7-9. The shape and configuration of the blades 150 shown in FIGS. 7-9 promote turbulence in the exhaust gas flow while reducing backpressure relative to other blade configurations. That is, the blades 150 may be designed so that most or all of the structure that increases backpressure will also generate turbulence (i.e., the mixing pipe 118 has very little structure that increases backpressure without also increasing turbulence). It will be appreciated that any suitable number, shape and/or spacing may be employed to suit a given application. For example, the blades 150 could be shaped and/or spaced similarly to the blades shown in any of FIGS. 1-6 or 10-14.

Figure 10:
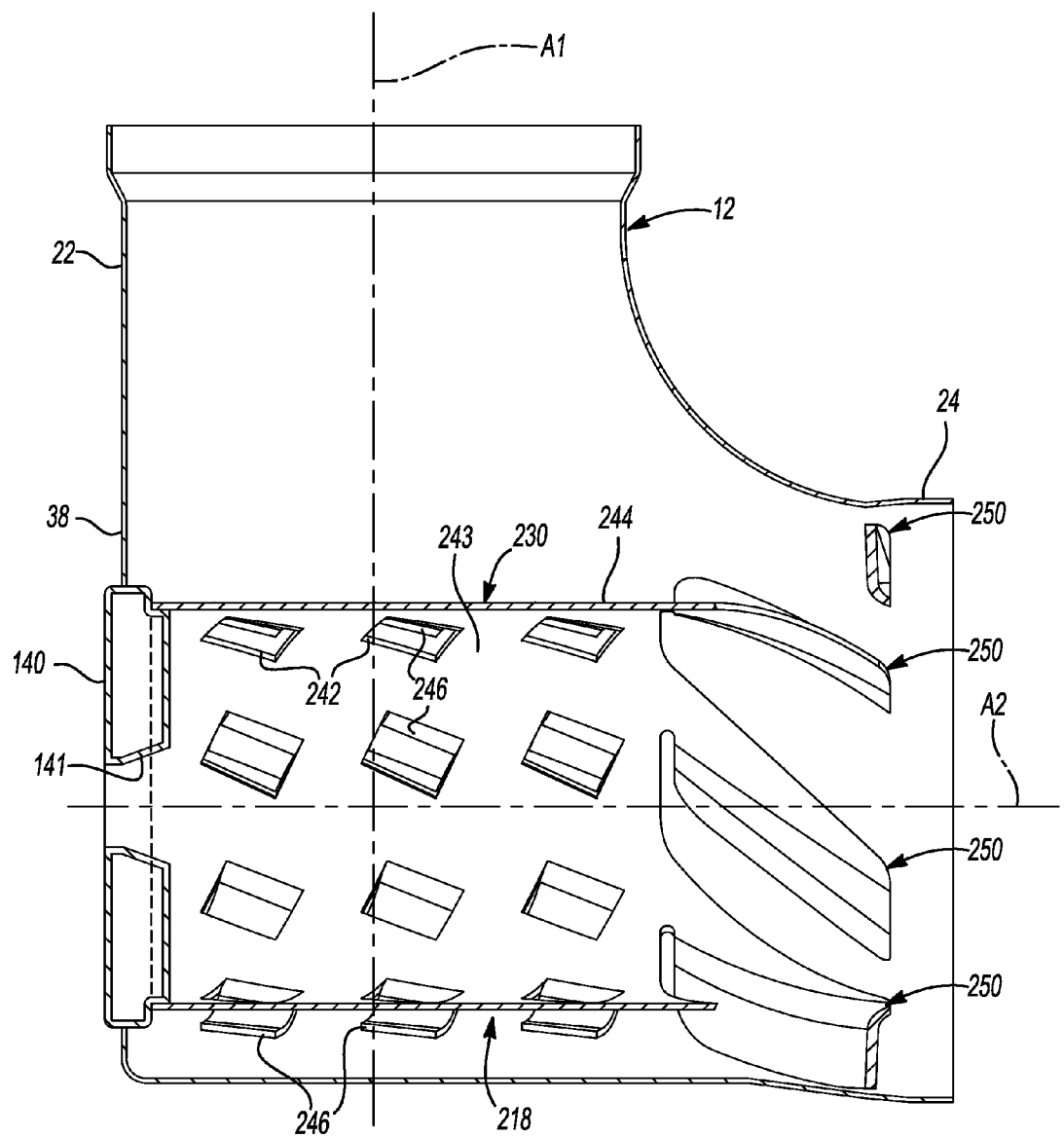
FIG. 10 is a cross-sectional view of another mixing pipe and exhaust pipe according to the principles of the present disclosure.
Figure 11:
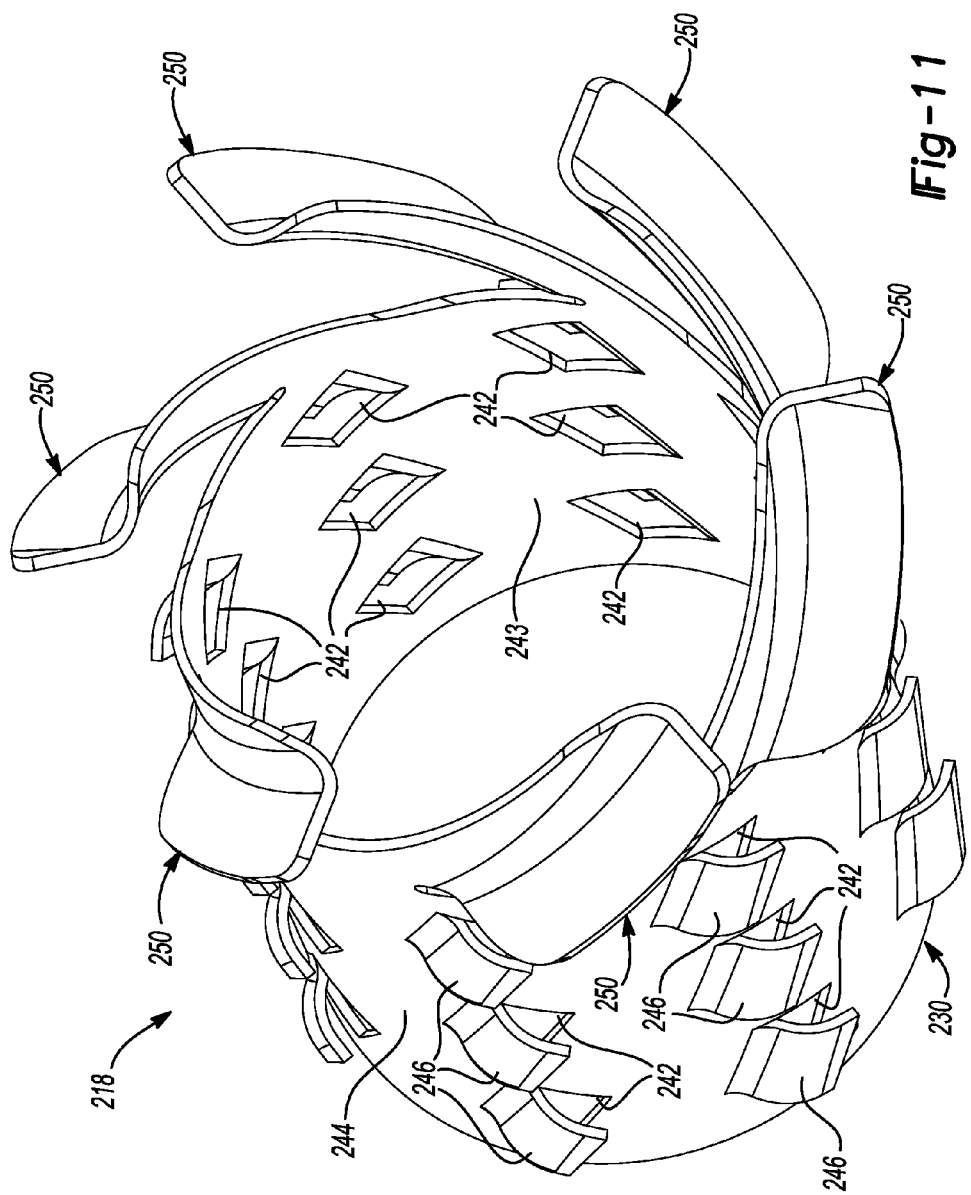
FIG. 11 is a perspective view of the mixing pipe of FIG. 10.
Figure 12:
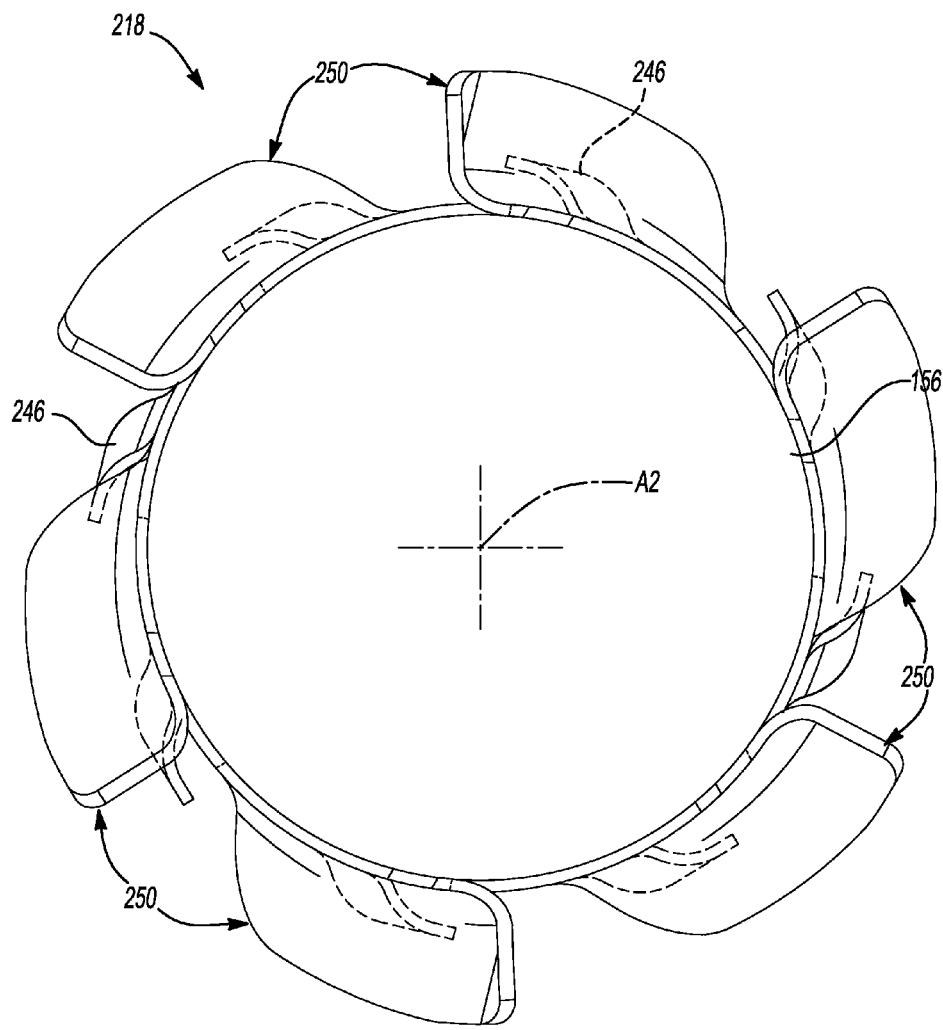
FIG. 12 is a plan view of a downstream end of the mixing pipe of FIG. 10.

With reference to FIGS. 10-12, another mixing pipe 218 is provided that may be installed in the exhaust pipe 12 instead of the mixing pipe 18 or 118. The structure and function of the mixing pipe 218 may be similar or identical to that of either of the mixing pipes 18, 118, apart from any differences described below and/or shown in the figures. Therefore, similar features will not be described again in detail.

The mixing pipe 218 may include a tubular portion 230 and a plurality of blades 250. The tubular portion 230 may include a plurality of openings 242 extending radially through inner and outer diametrical surfaces 243, 244 of the tubular portion 230. Deflectors 246 may be partially cut or stamped out of the tubular portion 230 (thereby forming the openings 242) and may extend generally radially outward from the tubular portion 230 and in a generally upstream direction. As described above, the deflectors 246 may increase the turbulence of the fluid flow within the exhaust pipe 12 and may promote a swirling motion in the fluid flow.

Figure 13:
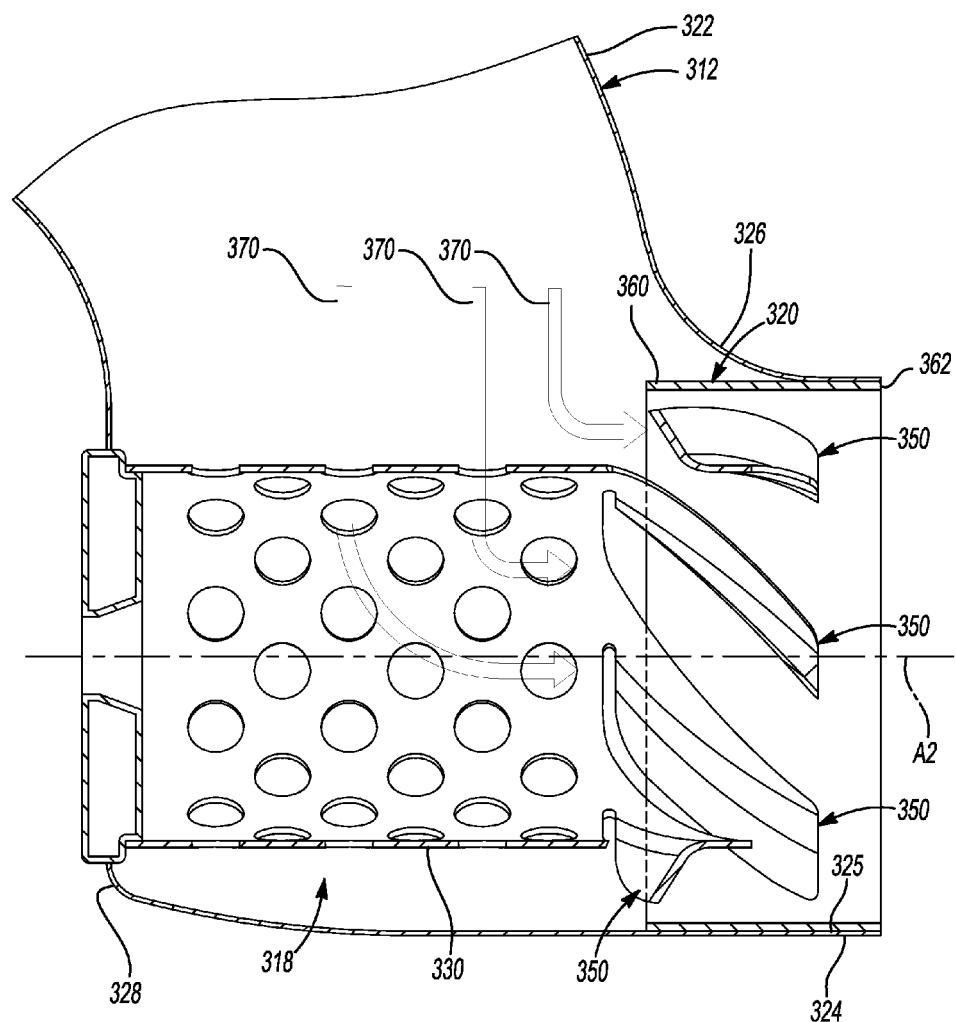
FIG. 13 is a cross-sectional view of another mixing pipe and exhaust pipe according to the principles of the present disclosure, the cross section is taken along line 13-13 of FIG. 14.
Figure 14:
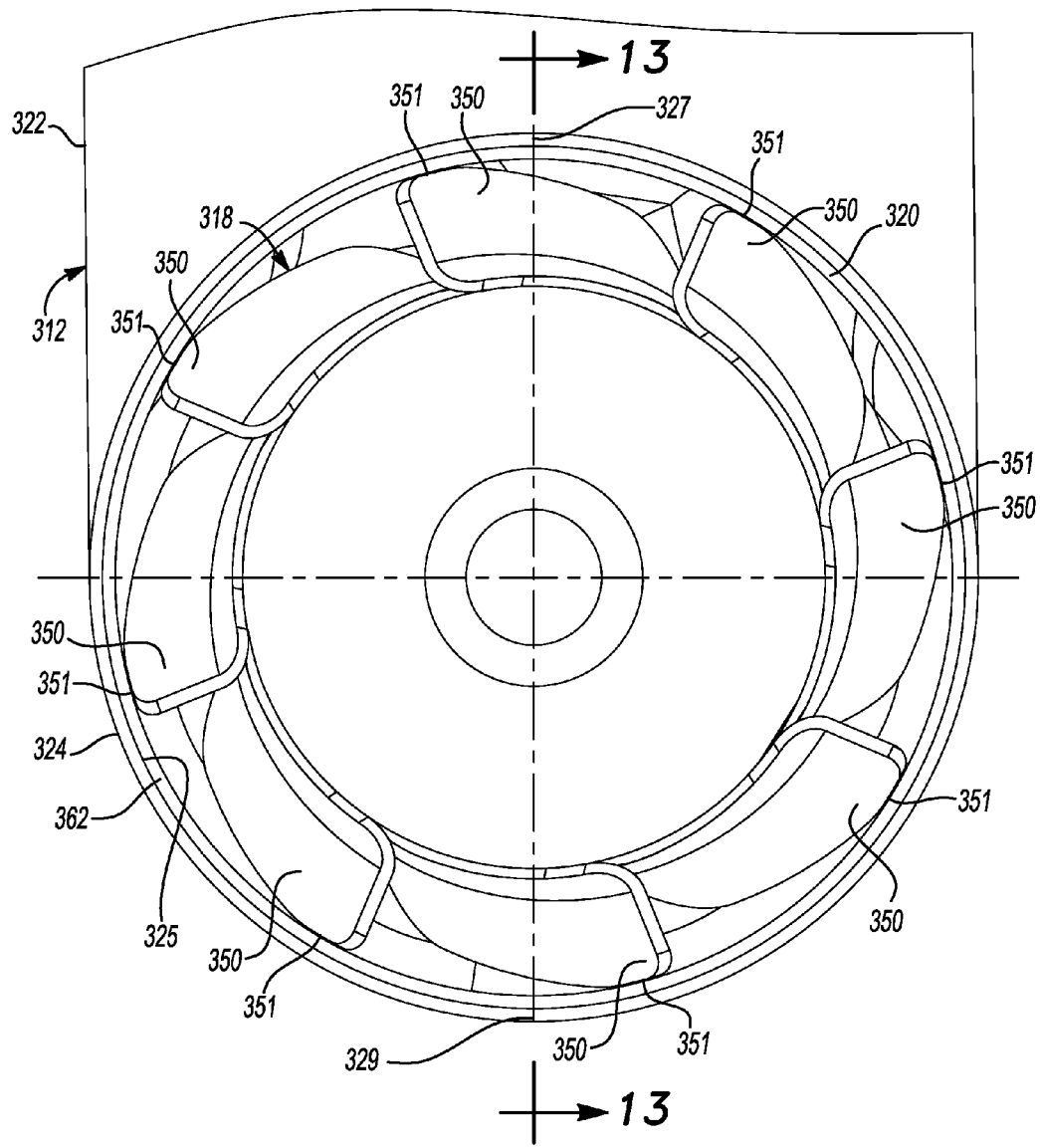
FIG. 14 is a plan view of the mixing pipe and exhaust pipe of FIG. 13.

With reference to FIGS. 13 and 14, another exhaust pipe 312 and another mixing pipe 318 are provided. The structure and function of the exhaust pipe 312 and mixing pipe 318 may be similar or identical to that of the exhaust pipe 12 and any of the mixing pipes 18, 118, 218, apart from any differences described below and/or shown in the figures. Therefore, similar features will not be described again in detail. Briefly, the exhaust pipe 312 may include a first portion 322 that is angled and/or curved relative to a second portion 324. As shown in FIG. 13, an inner elbow portion 326 (disposed at a twelve o'clock position 327 of the second portion 324 relative to the frame of reference of FIG. 14) and an outer elbow portion 328 (disposed at a six o'clock 329 position of the second portion 324 relative to the frame of reference of FIG. 14) may define a transition between the first and second portions 322, 324. Exhaust gas from the engine 20 (FIG. 1) may flow through the exhaust pipe 312 from the first portion 322 to the second portion 324.

The mixing pipe 318 may be disposed within the exhaust pipe 312 at or near the transition between the first and second portions 322, 324. The mixing pipe 318 may include a tubular portion 330 and a plurality of blades 350. A support ring 320 may be provided to reinforce the blades 350 and support the blades 350 relative to the exhaust pipe 312. The support ring 320 may be a generally cylindrical and annular member disposed between an inner diametrical surface 325 of the second portion 324 of the exhaust pipe 312 and radially outermost portions 351 (FIG. 14) of the blades 350. A longitudinal axis of the support ring 320 may be collinear with a longitudinal axis A2 of the second portion 324 of the exhaust pipe 312. The support ring 320 may engage the inner diametrical surface 325 and the radially outermost portions 351 by a press fit, for example. in some embodiments, the support ring 320 may be welded and/or otherwise fixedly attached to the inner diametrical surface 325 and the radially outermost portions 351.

As shown in FIG. 13, the support ring 320 includes an upstream axial end 360 and a downstream axial end 362. In some embodiments, the upstream axial end 360 may be disposed generally near but radially spaced apart from the inner elbow portion 326 of the exhaust pipe 312. In such embodiments, in order to flow into the second portion 324 of the exhaust pipe 312, the exhaust gas cannot flow immediately along the inner elbow portion 326 and must separate from the inner elbow portion 326 to enter the support ring 320 through the upstream axial end 360 (i.e., the support ring 320 forces the exhaust gas to take a wider turn into the second portion 324 at the twelve o'clock position 327).

As shown in FIG. 14, the mixing pipe 318 may be angularly positioned within the exhaust pipe 312 so that one of the blades 350 is disposed at the twelve o'clock position 327. Exhaust gas flow paths 370 from the first portion 322 to the second portion 324 have radii of increasing size the farther away they are from the inner elbow portion 326. Therefore, the exhaust gas flow path 370 flowing through the support ring 320 at the twelve o'clock position 327 has the shortest radius. Therefore, a large volume of exhaust gas may flow along the flow path 370 leading to the twelve o'clock position 327. Accordingly, having one of the blades 350 disposed at the twelve o'clock position 327 can advantageously generate more turbulence in the exhaust pipe 312, as a large volume of exhaust gas will be influenced by the blade 350 disposed at the twelve o'clock position 327.

It will be appreciated that the axial length of the support ring 320 may be longer or shorter relative to the blades 350 than the axial length shown in FIG. 13. In some embodiments, the support ring 320 could include openings (not shown) extending radially through the inner and outer diametrical surfaces of the support ring 320.

While the blades 50, 150, 250, 350 are shown in the figures and described above as extending from the downstream axial end of the tubular portion 30, 130, 230, 330, it will be appreciated that the blades 50, 150, 250, 350 could extend outward from a location between the upstream and downstream axial ends of the tubular portion 30, 130, 230, 330. In some embodiments, the downstream axial end of the tubular portion 30, 130, 230, 330 may be located farther downstream than downstream tips of the blades 50, 150, 250, 350.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aftertreatment system comprising:
an exhaust pipe receiving exhaust gas from an engine; and
a mixing pipe disposed in the exhaust pipe and including a tubular portion and a plurality of blades extending from a longitudinal end of the tubular portion, the tubular portion including a plurality of openings extending through inner and outer surfaces of the tubular portion, each of the plurality of blades including a first end attached to the tubular portion and a second end that is spaced apart from the tubular portion and unattached to adjacent blades, the blades further including a first portion contiguously extending from and being shaped as the inner and outer surfaces of the tubular portion and a second portion extending downstream of the tubular portion and radially outward from the first portion, wherein each blade overlaps a portion of an adjacent blade as viewed from a direction where a longitudinal axis of the tubular portion appears as a point.

2. The aftertreatment system of claim 1, wherein the exhaust pipe includes an upstream portion and a downstream portion that is angled relative to the upstream portion, and wherein each of the blades curve around a longitudinal axis of the downstream portion.

3. The aftertreatment system of claim 1, wherein the plurality of blades and the tubular portion define an integrally formed unitary body.

4. The aftertreatment system of claim 3, wherein the mixing pipe includes a smooth transition that is free of steps between the tubular portion and the plurality of blades.

5. The aftertreatment system of claim 4, wherein the plurality of openings are arranged in a plurality of rows extending circumferentially around the tubular portion, and wherein the openings of adjacent rows are misaligned with each other in a direction parallel to a longitudinal axis of a portion of the exhaust pipe.

6. The aftertreatment system of claim 1, further comprising an annular member disposed within the exhaust pipe radially between an inner diameter of a portion of the exhaust pipe and radially outermost portions of the plurality blades, the annular member supporting the plurality of blades relative to the exhaust pipe.

7. The aftertreatment system of claim 1, wherein the tubular portion includes a plurality of deflectors, each of the plurality of deflectors disposed adjacent a corresponding one of the plurality of openings.

8. The aftertreatment system of claim 7, wherein the deflectors extend outward from the outer diametrical surface.

9. The aftertreatment system of claim 1, wherein each of the plurality of blades includes a distal end having an L-shaped profile.

10. The aftertreatment system of claim 1, further comprising: a reductant injector disposed along a longitudinal axis of a portion of the exhaust pipe at an upstream end of the tubular portion; and a catalyst disposed downstream of the mixing pipe and the reductant injector.

11. The aftertreatment system of claim 1, wherein the exhaust pipe includes an upstream portion and a downstream portion that is angled relative to the upstream portion, wherein fluid flowing from the upstream portion of the exhaust pipe to into the downstream portion flows along one of a plurality of flow paths, each flow path having a radius of a different size, and wherein one of the blades is disposed along the flow path having the smallest radius.

12. An aftertreatment system comprising:
an exhaust pipe receiving exhaust gas from an engine; and
a mixing pipe disposed in the exhaust pipe and including a tubular portion and a plurality of blades extending from the tubular portion, the tubular portion including a plurality of openings, the mixing pipe defining a first exhaust flow path flowing through at least one of the openings and a second exhaust flow path flowing outside of the tubular portion and between the blades, wherein each of the blades includes a first end attached to the tubular portion and a second end that is spaced apart from the tubular portion and unattached to adjacent blades, the blades extending radially outwardly from an inner surface of the tubular portion on a conically spiral path such that an upstream portion of each blade outwardly extends a lesser distance than a downstream portion of the same blade, all portions of the mixing pipe remaining clear of an interior volume defined by the inner surface of the tubular portion.

13. The aftertreatment system of claim 12, wherein the second exhaust flow path is an annular flow path extending around the tubular portion.

14. The aftertreatment system of claim 12, wherein the blades extend downstream from an axial end of the tubular portion.

15. The aftertreatment system of claim 14, wherein each of the blades includes a first end attached to the tubular portion and a second end that is spaced apart from the tubular portion and unattached to adjacent blades.

16. The aftertreatment system of claim 15, wherein the exhaust pipe includes an upstream portion and a downstream portion that is angled relative to the upstream portion, and wherein each of the blades curve around a longitudinal axis of the downstream portion.

17. The aftertreatment system of claim 12, wherein the plurality of blades and the tubular portion define an integrally formed unitary body.

18. The aftertreatment system of claim 17, wherein the mixing pipe includes a smooth transition that is free of steps between the tubular portion and the plurality of blades.

19. The aftertreatment system of claim 12, wherein the plurality of openings are arranged in a plurality of rows extending circumferentially around the tubular portion, and wherein the openings of adjacent rows are misaligned with each other in a direction parallel to a longitudinal axis of a portion of the exhaust pipe.

20. The aftertreatment system of claim 12, further comprising an annular member disposed within the exhaust pipe radially between an inner diameter of a portion of the exhaust pipe and radially outermost portions of the plurality blades, the annular member supporting the plurality of blades relative to the exhaust pipe.

21. The aftertreatment system of claim 12, wherein the tubular portion includes a plurality of deflectors, each of the plurality of deflectors disposed adjacent a corresponding one of the plurality of openings.

22. The aftertreatment system of claim 21, wherein the deflectors extend outward from the outer diametrical surface.

23. The aftertreatment system of claim 12, wherein each of the plurality of blades includes a distal end having an L-shaped profile.

* * * * *